United States Patent
Luo et al.

(10) Patent No.: US 10,809,431 B2
(45) Date of Patent: Oct. 20, 2020

(54) POLARIZER AND TOUCH DEVICE

(71) Applicants: BOE TECHNOLOGY GROUP CO., LTD., Beijing (CN); CHENGDU BOE OPTOELECTRONICS TECHNOLOGY CO., LTD., Sichuan (CN)

(72) Inventors: Hongqiang Luo, Beijing (CN); Jianjun Wu, Beijing (CN); Chang Zhang, Beijing (CN)

(73) Assignees: BOE TECHNOLOGY GROUP CO., LTD., Beijing (CN); CHENGDU BOE OPTOELECTRONICS TECHNOLOGY CO., LTD., Chengdu, Sichuan (CN)

(*) Notice: Subject to any disclaimer, the term of this patent is extended or adjusted under 35 U.S.C. 154(b) by 274 days.

(21) Appl. No.: 16/122,326

(22) Filed: Sep. 5, 2018

(65) Prior Publication Data
US 2019/0265823 A1 Aug. 29, 2019

(30) Foreign Application Priority Data
Feb. 28, 2018 (CN) .................... 2018 2 0281136 U

(51) Int. Cl.
*G02B 5/30* (2006.01)
*G06F 3/041* (2006.01)

(52) U.S. Cl.
CPC ............ *G02B 5/3025* (2013.01); *G06F 3/041* (2013.01)

(58) Field of Classification Search
CPC .......... G02B 5/30–3091; G02B 5/3025; G02B 5/3058; G02B 5/3083; G02B 27/286; G06F 3/041
USPC ........................... 359/486.01, 483.01–494.01
See application file for complete search history.

(56) References Cited

U.S. PATENT DOCUMENTS

2020/0225789 A1* 7/2020 Akimoto ............... G06F 3/0414

* cited by examiner

*Primary Examiner* — William R Alexander
*Assistant Examiner* — Henry A Duong
(74) *Attorney, Agent, or Firm* — Nath, Goldberg & Meyer; Joshua B. Goldberg

(57) ABSTRACT

The present disclosure provides a polarizer including: a first body portion, a second body portion and two third body portions. The polarizer is applied in a touch device, the polarizer is provided with a through hole, and the first body portion and the second body portion are respectively located on two sides of the through hole in a first direction. The first body portion is configured to attach to the pressing portion, and the second body portion is configured attach to the touch region of the touch substrate; and the two third body portions are respectively located on two sides of the first body portion in a second direction, each of the two third body portions connects the first body portion and the second body portion, and the second direction is perpendicular to the first direction.

19 Claims, 5 Drawing Sheets

B-B'

C-C'

US 10,809,431 B2

1
POLARIZER AND TOUCH DEVICE

CROSS-REFERENCE TO RELATED APPLICATION

This application claims the priority of China Patent Application No. 201820281136.8, filed in China on Feb. 28, 2018, the entire contents of which are hereby incorporated by reference.

TECHNICAL FIELD

The present disclosure relates to the field of touch technologies, and in particular, to a polarizer and a touch device.

BACKGROUND

At present, the assembly process of a touch display module is as shown in FIG. 1: a driving circuit board (e.g. Flexible Printed Circuit board, FPC) 13 provided with a driving chip (e.g. integrated circuit, IC) 12 is bonded to a bonding region 11b of a touch substrate 11; then, the touch substrate 11 is attached to a polarizer 14, the touch substrate 11 and the polarizer 14 which are bonded together are attached to a cover plate 15 by an adhesive (e.g. Optically Clear Adhesive) 17; and then, the touch substrate 11, the polarizer 14 and the cover plate 15 which are bonded together are attached to a display substrate 16 by the adhesive 17. Since the driving circuit board 13 has a certain thickness, after the polarizer 14 is attached to the touch substrate 11 as shown in FIG. 2, a gap G would be formed around the bonding region 11b of the touch substrate 11 and the polarizer 14.

In order to prevent the gap from affecting the display region of the touch display module, a first solution adopted in the related art is: increasing the distance between the driving circuit board 13 and the touch region. A second solution is: a notch is formed on the polarizer 14 at a position corresponding to the driving circuit board 13, so as to avoid the driving circuit board 13, as shown in FIGS. 3 and 4. However, in the first solution, the width of a border is increased. In the second solution, a portion of the driving circuit board 13 adjacent to the touch substrate 11 is easily bent (as shown in FIG. 5), rendering the conductive film layer of the binding region bonding region 11b on the touch substrate 11 is easily broken, which causes product defects.

SUMMARY

The present disclosure provides a polarizer, comprising: a first body portion, a second body portion and two third body portions, wherein the polarizer is applied in a touch device, the touch device comprises a touch substrate and a driving circuit board, the touch substrate comprises a touch region and a bonding region on a side of the touch region, the driving circuit board comprises a pressing portion that is pressed against the bonding region; the polarizer is provided with a through hole, and the first body portion and the second body portion are respectively located on two sides of the through hole in a first direction; the first body portion is configured to attach to the pressing portion, and the second body portion is configured attach to the touch region of the touch substrate; and the two third body portions are respectively located on two sides of the first body portion in a second direction, each of the two third body portions connects the first body portion and the second body portion, and the second direction is perpendicular to the first direction.

2

Optionally, both ends of the first body portion do not extend beyond both ends of the through hole in the second direction.

Optionally, the through hole has a rectangular parallelepiped shape, and a length direction of the through hole is the second direction and a width direction of the through hole is the first direction.

Optionally, a width of the through hole is greater than or equal to a fitting tolerance in a case where the polarizer is attached to the touch substrate.

Optionally, a width of the through hole is greater than a thickness of the pressing portion.

Optionally, a width of the through hole is greater than or equal to 0.3 mm.

Optionally, both ends of the through hole respectively extend beyond both ends of the first body portion in the second direction.

Optionally, the both ends of the through hole respectively extend beyond the both ends of the first body portion in the second direction by 1.5 mm to 1.7 mm.

Optionally, the second body portion is disposed to attach to a portion of a space between the bonding region and the touch region.

The present disclosure also provides a touch device, comprising: a touch substrate, a driving circuit board, and a polarizer, the touch substrate comprises a touch region and a bonding region on a side of the touch region, the driving circuit board comprises a pressing portion that is pressed against the bonding region; wherein the polarizer is the polarizer described above, a first body portion of the polarizer is located on a side of the pressing portion that faces away from the touch substrate and is attached to the pressing portion; a second body portion of the polarizer is attached to the touch region of the touch substrate.

Optionally, an edge of the polarizer is aligned with an edge of the touch substrate.

Optionally, the touch device further comprises a display substrate being located on a side of the touch substrate facing away from the polarizer.

Optionally, the touch device further comprises a cover plate being located on a side of the polarizer facing away from the touch substrate.

BRIEF DESCRIPTION OF THE DRAWINGS

The drawings are intended to provide a further understanding to the disclosure and constitute a part of the specification for the purpose of illustrating the disclosure in conjunction with the specific embodiments below, but do not constitute a limit to the disclosure. In the drawing.

DETAILED DESCRIPTION OF THE EMBODIMENTS

The specific embodiments of the present disclosure will be described in detail below with reference to the accompanying drawings. It is to be understood that the specific embodiments described herein are intended to illustrate and explain the present disclosure and are not intended to limit it.

Figure 1:
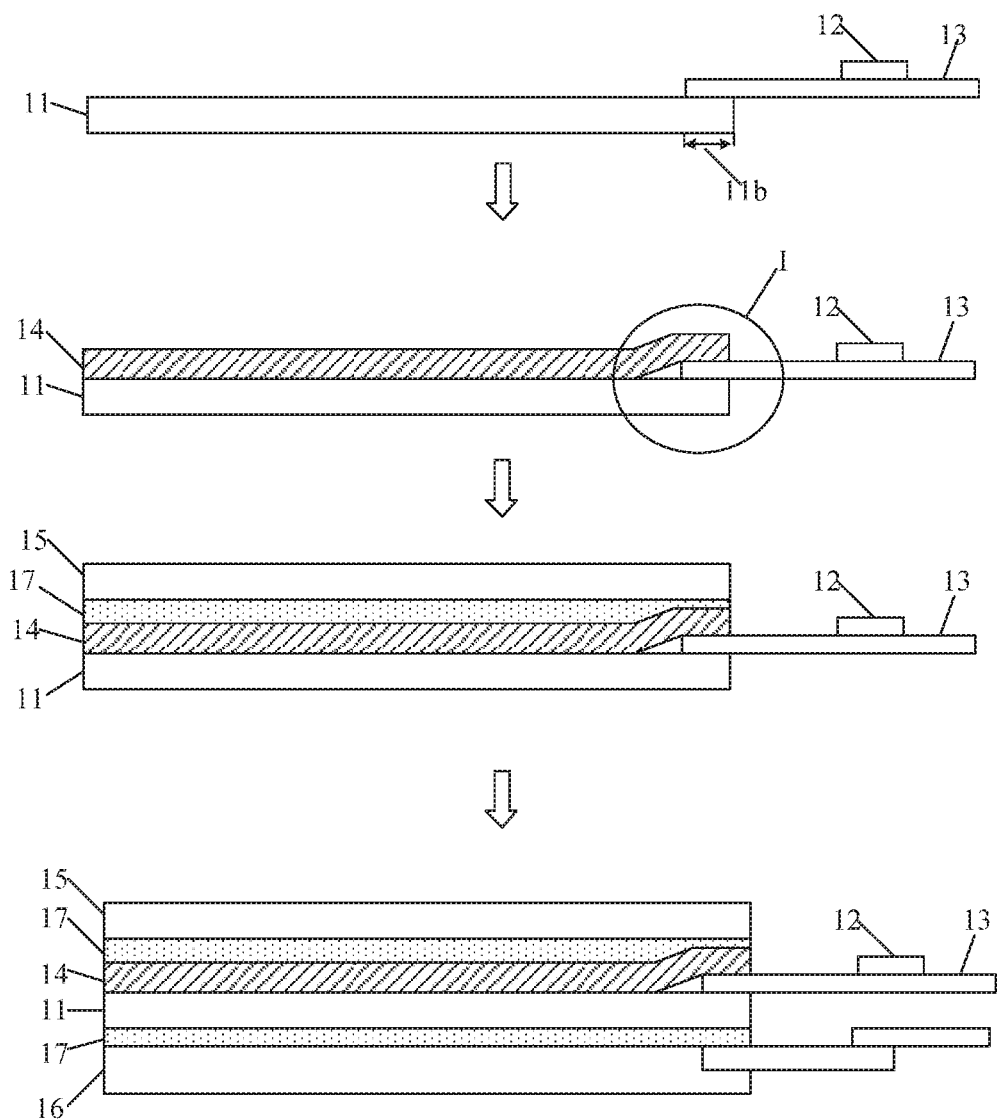
FIG. 1 shows an assembly procedure of a touch display module in the related art.
Figure 2:
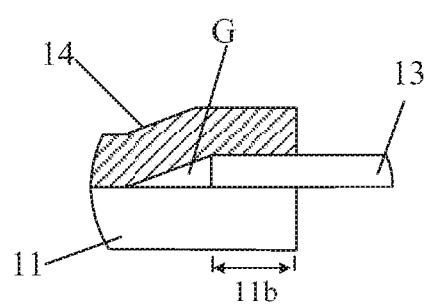
FIG. 2 is an enlarged view of the region I in FIG. 1.
Figure 3:
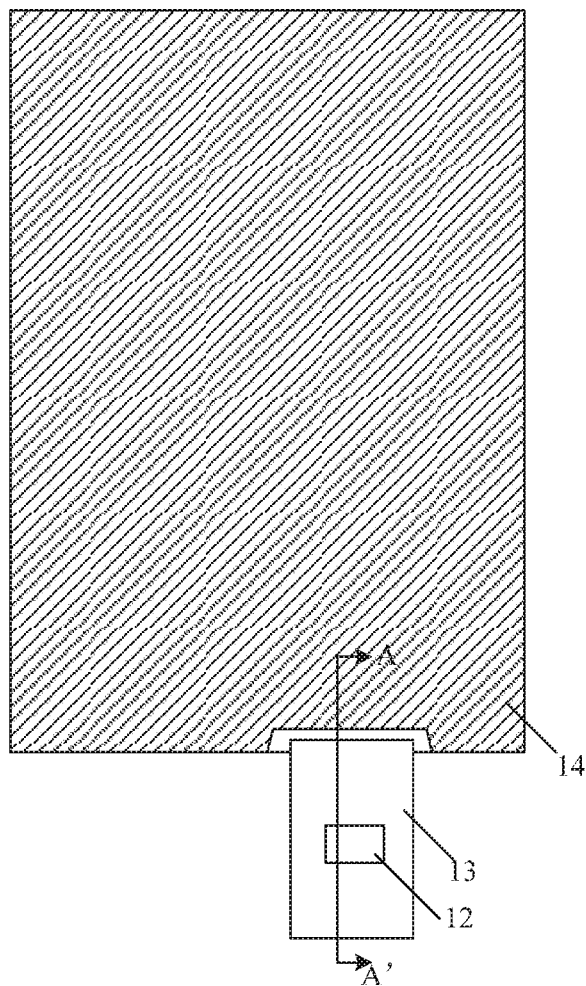
FIG. 3 is a top view showing a state in which the polarizer is attached to the touch substrate in an improvement of the related art.
Figure 4:
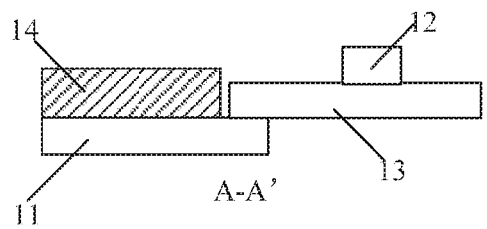
FIG. 4 is a cross-sectional view taken along line A-A' of FIG. 3.
Figure 5:
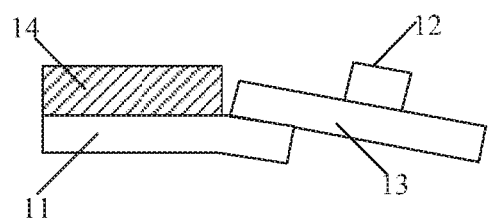
FIG. 5 is a schematic view showing a state in which the touch substrate in FIG. 4 is defective.
Figure 6:
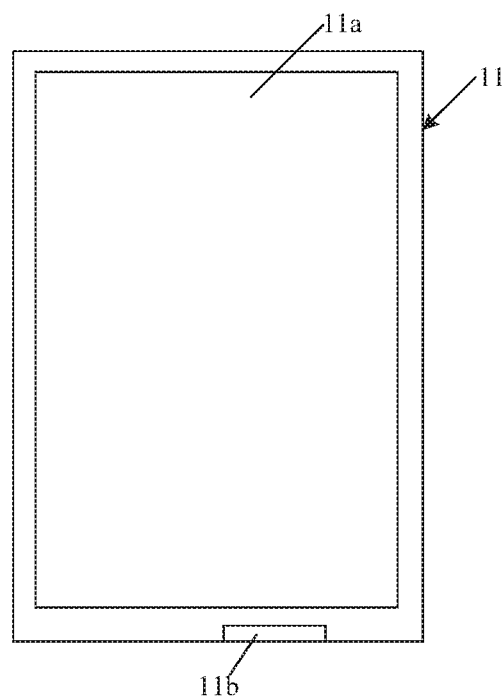
FIG. 6 is a top view showing a touch substrate in an embodiment of the present disclosure.
Figure 7:
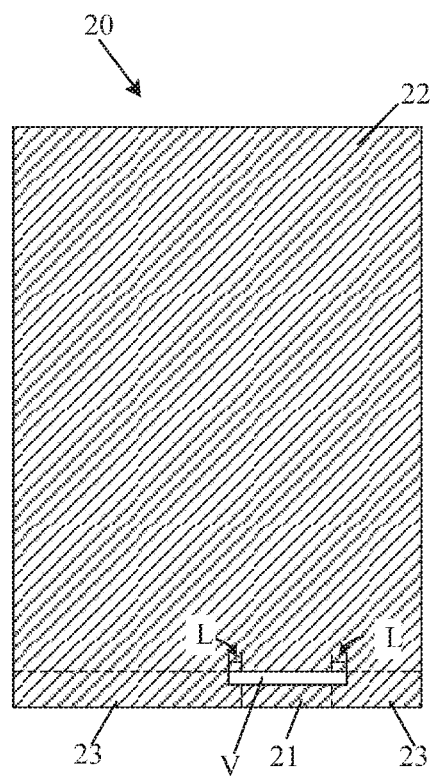
FIG. 7 is a top view showing a polarizer in an embodiment of the present disclosure.
Figure 8:
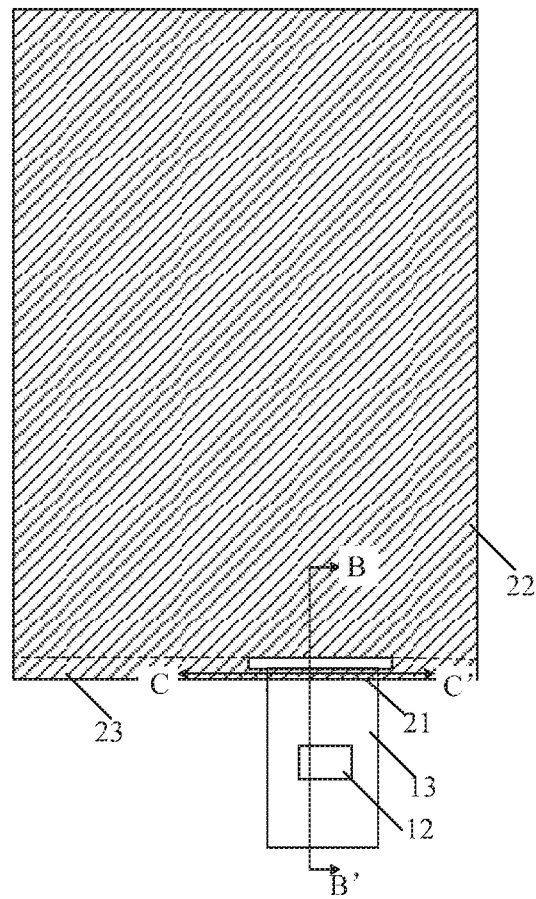
FIG. 8 is a top view showing a polarizer in the embodiment of the present disclosure being attached to the touch substrate and the driving circuit board.
Figure 9:
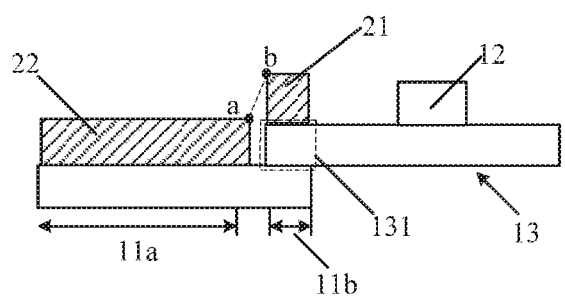
FIG. 9 is a cross-sectional view taken along line B-B' of FIG. 8.

As an aspect of the present disclosure, a polarizer is provided for use in a touch device which including a touch substrate and a driving circuit board. The polarizer is specifically a circular polarizer for reducing reflection of ambient light by the touch device. FIG. 6 is a top view showing a touch substrate; FIG. 7 is a top view showing a polarizer; FIG. 8 is a top view showing a polarizer, a touch substrate and a driving circuit board are attached with each other; and FIG. 9 is a cross-sectional view taken along line B-B' of FIG. 8. Referring to FIGS. 6 to 9, a touch device 11 includes a touch substrate and a driving circuit board. The touch substrate comprises a touch region 11a and a bonding region 11b on a side of the touch region 11a. The driving circuit board 13 includes a pressing portion 131 that is pressed against the bonding region 11b. A polarizer 20 is provided with a through hole V. The polarizer 20 includes a first body portion 21, a second body portion 22 and two third body portions 23. The first body portion 21 and the second body portion 22 are respectively located on two sides of the through hole V in a first direction (up and down direction of FIG. 7). The first body portion 21 is configured to attach to the pressing portion 131, and the second body portion 22 is configured attach to the touch region 11a of the touch substrate 11. The two third body portions 23 are respectively located on two sides of the first body portion 21 in a second direction. Each of the two third body portions 23 connects the first body portion 21 and the second body portion 22, and the second direction is perpendicular to the first direction. It should be understood that the first body portion 21 is a portion where the polarizer 20 is attached to the pressing portion 131, that is, the dimension of the first body portion 21 in the second direction is the same as the dimension of the pressing portion 131 in the second direction.

When the polarizer 20 of the present disclosure is attached to the touch substrate 11, the first body portion 21 is attached to the surface of the driving circuit board 13, and the driving circuit board 13 is sandwiched between the first body portion 21 and the bonding region 11b of the touch substrate 11, and the second body portion 22 is attached to the touch substrate 11. Since the first body portion 21 and the second body portion 22 are spaced apart by the through hole V, the region of the second body portion 22 that faces the first body portion 21 and is close to the first body portion 21 is not pulled by the first body portion 21, so as to be sufficiently attached to the touch substrate 11. Therefore, a gap between the region of the second body portion 22 and the touch substrate 11 is avoided, so that it is no longer necessary to increase the width of the border. In addition, the first body portion 21 is attached to the driving circuit board 13, the driving circuit board 13 is sandwiched between the first body portion 21 and the bonding region 11b of the touch substrate 11, and the first body portion 21 is connected to the second body portion 22 through two third body portions 23. Therefore, the first body portion 21 can fix the driving circuit board 13, thereby reducing the possibility that the conductive layer of the bonding region 11b is broken due to the bending of the driving circuit board 13. Further, the touch device applying the polarizer reduces the occurrence of defects while achieving a narrow border.

Four border regions may be formed around the touch region 11a of the touch substrate 11, and these border regions form a border (frame). The bonding region 11b is located on one of the border regions. The second body portion 22 of the polarizer 20 can be attached to the other three border regions where the bonding region is not provided. Alternatively, when there is a gap between the bonding region 11b and the touch region 11a, the second body portion 22 may also be attached to a portion of a space (gap) between the bonding region 11b and the touch region 11a (as shown in FIG. 9). Therefore, the second body portion 22 is also attached to a portion of the space (gap) between the bonding region 11b and the touch region 11a in addition to the touch region 11a of the touch substrate, so that the engagement between the polarizer and the touch substrate is strong. Furthermore, the third body portion 23 is attached to the border region in which the bonding region 11b is provided. Optionally, both ends of the first body portion 21 do not extend beyond both ends of the through hole V in the second direction (left and right direction of FIG. 7), so as to reduce the possibility that the gap extends toward the touch region 11a.

Optionally, the through hole V has a rectangular parallelepiped shape for facilitating production. A length direction of the through hole V is the second direction, a width direction of the through hole V is the first direction, and a depth direction of the through hole V is the thickness direction of the polarizer 20. As a result, the distance between the first body portion 21 and the second body portion 22 is reduced, so as to achieve a narrow border.

In order to ensure that the first body portion 21 can be attached to the pressing portion 131 of the driving circuit board 13, and the second body portion 22 does not contact the driving circuit board 13 when the polarizer 20 is attached to the touch substrate 11, it is an option that a width of the through hole V is greater than or equal to a fitting tolerance in a case where the polarizer 20 is attached to the touch substrate 11. The fitting tolerance is a maximum value of an actual position deviating from a target position in a state of engagement. For example, the target position is considered as a reference position, and the actual position ranges between [−0.3 mm, +0.3 mm], and the fitting tolerance is 0.3 mm.

After the polarizer 20 is attached to the touch substrate 11 and the pressing portion 131 of the driving circuit board 13, the first body portion 21 and the second body portion 22 are on different planes. In this case, the width of the through hole V is a linear distance between two points a and b as shown in FIG. 9. If the width of the through hole V is less than or equal to the thickness of the pressing portion 131, the end of the second body portion 22 adjacent to the first body portion 21 cannot be attached to the touch substrate 11. Therefore, in order to make the second body portion 22 completely attach on the touch substrate 11 as much as possible, the width of the through hole V is optionally greater than the thickness of the pressing portion 131. In a specific embodiment, the fitting tolerance of the polarizer 20 and the touch substrate 11 is 0.3 mm, and the thickness of the pressing portion 131 of the driving circuit board 13 is less than 0.1 mm. In a case that the width of the through hole V is greater than or equal to the fitting tolerance is satisfied, the width of the through hole V is also definitely greater than the thickness of the pressing portion 131. Therefore, the width of the through hole V can be set to be 0.3 mm or more. In order to achieve the narrow border, the width of the through hole V can be set to 0.3 mm.

It is considered that if the length of the through hole V is small, the polarizer 20 may have a gap with the touch substrate 11 at the two ends of the pressing portion 131 in the second direction, and this gap may extend toward the touch region 11a. Therefore, in the present disclosure, both ends of the through hole V in the second direction respectively extend beyond the both ends of the first body portion 21 in the second direction (as shown in FIGS. 7 and 8), so as to reduce the possibility of the gap extending toward the touch region 11a.

Figure 10:
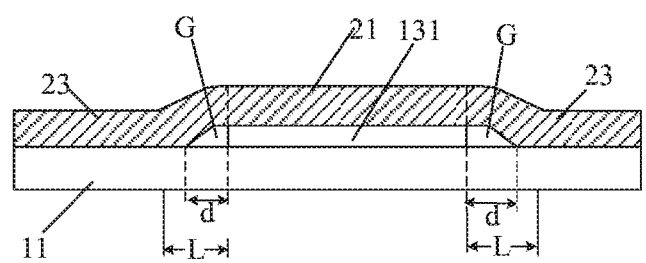
FIG. 10 is a cross-sectional view taken along line C-C' of FIG. 8.

In practical applications, the diameter d of the gap G generated by the polarizer 20 and the touch substrate 11 in a horizontal direction (as shown in FIG. 10) is about 1.2 mm, and the fitting tolerance of the polarizer 20 and the touch substrate 11 is 0.3 mm. In this case as shown in FIGS. 7 and 10, the both ends of the through hole V respectively extend beyond the both ends of the first body portion in the second direction by length L ranging from 1.5 mm to 1.7 mm. On one hand, when both ends of the through hole V extend beyond the both ends of the first body portion 21 in the second direction by the length L more than 1.5 mm (i.e. 1.2 mm+0.3 mm), the gap G between the polarizer 20 and the touch substrate 11 can be located on both sides of the driving circuit board 13 in the second direction (as shown in FIG. 10) without extending to the display touch region 11a, under an interval effect of the through hole V. On the other hand, when the both ends of the through hole V extend beyond the both ends of the first body portion 21 in the second direction by the length L less than 1.7 mm, it makes the third body portion 23 have a sufficient length, so as to provide a sufficient engagement between the first body portion 21 and the second body portion 22.

Figure 11:
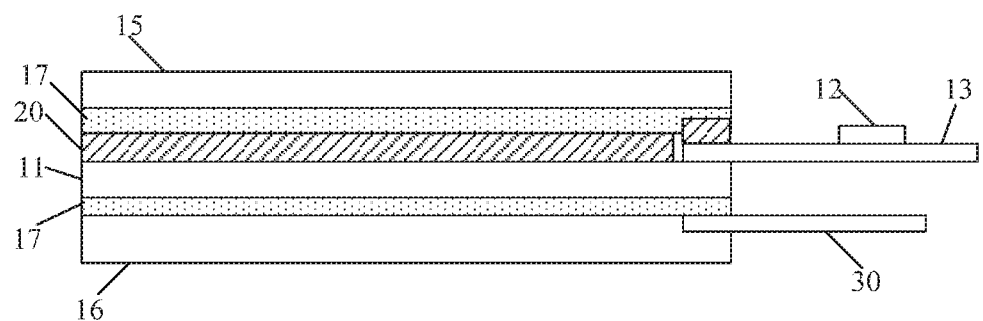
FIG. 11 is a schematic view showing a touch device in an embodiment of the present disclosure.

Correspondingly, the present disclosure further provides a touch device. As shown in FIGS. 6, 9, and 11, the touch device includes a touch substrate 11, a driving circuit board 13, and a polarizer 20 described above. The touch substrate 11 includes a touch region 11a and a bonding region 11b on a side of the touch region 11a. The bonding region 11b is provided with a conductive layer, and the conductive layer includes a plurality of electrodes. The driving circuit board 13 includes a pressing portion 131 that is press-fitted with (pressed against) the bonding region 11b, so as to be electrically connected to the plurality of electrodes. The first body portion of the polarizer 20 is located on a side of the pressing portion 131 that faces away from the touch substrate 11 and is attached to the pressing portion 131 (the driving circuit board 13 is sandwiched between the first body portion 21 and the touch substrate 11). The second body portion 22 of the polarizer 20 is attached to the touch region 11a of the touch substrate 11.

Since the first body portion 21 and the second body portion 22 are spaced apart by the through hole V, the first body portion 21 and the second body portion 22 do not pull each other at the through hole, so as to allow the second body portion 22 be sufficiently attached to the touch substrate 11. Therefore, a gap between the region of the second body portion 22 and the touch substrate 11 is avoided, so that it is no longer necessary to increase the width of the border. In addition, the first body portion 21 is attached to the driving circuit board 13, and the first body portion 21 is connected to the second body portion 22 through two third body portions 23. Therefore, the first body portion 21 can fix the driving circuit board 13, thereby reducing the possibility that the conductive layer of the bonding region 11b is broken due to the bending of the driving circuit board 13, so as to ensure the yield of the touch device.

The edge of the polarizer 20 is aligned with the edge of the touch substrate 11 to facilitate the process, and can make the polarizer 20 fully cover the touch substrate 11, so as to ensure that the reflection of the light at any position by the touch substrate 11 can be reduced. Since the polarizer 20 does not extend beyond the touch substrate 11, the polarizer 20 can be prevented from occupying the space of the border, thereby achieving a narrow border.

Furthermore, the touch device further includes a display substrate 16, a cover plate 15, and a Chip on Film (hereinafter referred to as COF) 30. The display substrate 16 is located on a side of the touch substrate 11 facing away from the polarizer 20. The cover plate 15 is located on a side of the polarizer 20 facing away from the touch substrate 11. The COF 30 is electrically connected to the electrodes on the display substrate 16, so as to provide a display driving signal for the display region of the display substrate 16. The display substrate 16 may be an organic electroluminescence display (OLED) substrate. In this case, the display substrate 11 may include a back plate, a light emitting unit disposed on the back plate, and an encapsulation layer encapsulating the light emitting unit. Definitely, the display substrate 16 can also be a liquid crystal display (LCD) substrate, and specifically includes an opposite array substrate, a color film substrate, and a liquid crystal layer therebetween. An adhesive paste 17 is disposed between the polarizer 20 and the cover plate 15, and between the touch substrate 11 and the display substrate 16.

It should be understood that the above embodiments are merely exemplary embodiments employed to explain the principles of the present disclosure, but the present disclosure is not limited thereto. Various modifications and improvements can be made by those skilled in the art without departing from the spirit and scope of the disclosure, and such modifications and improvements are also considered to be within the scope of the disclosure.

What is claimed is:

1. A polarizer, comprising: a first body portion, a second body portion and two third body portions, wherein
the polarizer is applied in a touch device, the touch device comprises a touch substrate and a driving circuit board, the touch substrate comprises a touch region and a bonding region on a side of the touch region, the driving circuit board comprises a pressing portion that is pressed against the bonding region;
the polarizer is provided with a through hole, and the first body portion and the second body portion are respectively located on two sides of the through hole in a first direction; the first body portion is configured to attach to the pressing portion, and the second body portion is configured attach to the touch region of the touch substrate; and
the two third body portions are respectively located on two sides of the first body portion in a second direction, each of the two third body portions connects the first body portion and the second body portion, and the second direction is perpendicular to the first direction.

2. The polarizer according to claim 1, wherein both ends of the first body portion do not extend beyond both ends of the through hole in the second direction.

3. The polarizer according to claim 2, wherein both ends of the through hole respectively extend beyond both ends of the first body portion in the second direction.

4. A touch device, comprising: a touch substrate, a driving circuit board, and a polarizer, the touch substrate comprises a touch region and a bonding region on a side of the touch region, the driving circuit board comprises a pressing portion that is pressed against the bonding region; wherein
the polarizer is the polarizer according to claim 2, a first body portion of the polarizer is located on a side of the pressing portion that faces away from the touch substrate and is attached to the pressing portion; a second body portion of the polarizer is attached to the touch region of the touch substrate.

5. The polarizer according to claim 1, wherein the through hole has a rectangular parallelepiped shape, and a length direction of the through hole is the second direction and a width direction of the through hole is the first direction.

6. The polarizer according to claim 5, wherein a width of the through hole is greater than or equal to a fitting tolerance in a case where the polarizer is attached to the touch substrate.

7. The polarizer according to claim 6, wherein both ends of the through hole respectively extend beyond both ends of the first body portion in the second direction.

8. The polarizer according to claim 5, wherein a width of the through hole is greater than a thickness of the pressing portion.

9. The polarizer according to claim 8, wherein both ends of the through hole respectively extend beyond both ends of the first body portion in the second direction.

10. The polarizer according to claim 5, wherein a width of the through hole is greater than or equal to 0.3 mm.

11. The polarizer according to claim 10, wherein both ends of the through hole respectively extend beyond both ends of the first body portion in the second direction.

12. The polarizer according to claim 5, wherein both ends of the through hole respectively extend beyond both ends of the first body portion in the second direction.

13. The polarizer according to claim 1, wherein both ends of the through hole respectively extend beyond both ends of the first body portion in the second direction.

14. The polarizer according to claim 13, wherein the both ends of the through hole respectively extend beyond the both ends of the first body portion in the second direction by 1.5 mm to 1.7 mm.

15. The polarizer according to claim 1, wherein the second body portion is disposed to attach to a portion of a space between the bonding region and the touch region.

16. A touch device, comprising: a touch substrate, a driving circuit board, and a polarizer, the touch substrate comprises a touch region and a bonding region on a side of the touch region, the driving circuit board comprises a pressing portion that is pressed against the bonding region; wherein
the polarizer is the polarizer according to claim 1, a first body portion of the polarizer is located on a side of the pressing portion that faces away from the touch substrate and is attached to the pressing portion; a second body portion of the polarizer is attached to the touch region of the touch substrate.

17. The touch device according to claim 16, wherein an edge of the polarizer is aligned with an edge of the touch substrate.

18. The touch device according to claim 16, wherein the touch device further comprises a display substrate being located on a side of the touch substrate facing away from the polarizer.

19. The touch device according to claim 18, wherein the touch device further comprises a cover plate being located on a side of the polarizer facing away from the touch substrate.

* * * * *